United States Patent
Park

(10) Patent No.: US 6,992,838 B2
(45) Date of Patent: Jan. 31, 2006

(54) OBJECTIVE LENS WITH THE DIFFRACTIVE SURFACE FOR DVD/CD COMPATIBLE OPTICAL PICKUP

(75) Inventor: Cheon-Ho Park, Kyunggi-Do (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 0 days.

(21) Appl. No.: 10/738,265

(22) Filed: Dec. 17, 2003

(65) Prior Publication Data

US 2005/0078384 A1    Apr. 14, 2005

(30) Foreign Application Priority Data

Oct. 13, 2003    (KR) ............... 10-2003-0071162

(51) Int. Cl.
G02B 3/02    (2006.01)
G02B 13/18    (2006.01)
G02B 3/08    (2006.01)
G11B 7/00    (2006.01)

(52) U.S. Cl. ............... 359/719; 359/741; 369/44.23; 369/112.07

(58) Field of Classification Search ........ 359/718–719, 359/722, 741–743; 369/44.23, 112.01, 112.06, 369/112.07, 112.08, 112.12
See application file for complete search history.

(56) References Cited

FOREIGN PATENT DOCUMENTS

| JP | 09145995 A | 6/1997 |
|----|------------|--------|
| JP | 2000081566 A | 3/2000 |
| JP | 2001051192 A | 2/2001 |

*Primary Examiner*—Georgia Epps
*Assistant Examiner*—Alicia M Harrington
(74) *Attorney, Agent, or Firm*—Christensen O'Connor Johnson Kindness PLLC

(57) ABSTRACT

Disclosed is an objective lens for a DVD/CD compatible optical pickup, which improves optical efficiency while minimizing aberration occurring due to different disc thicknesses of different optical storage media. The objective lens has first and second aspherical lens surfaces.

18 Claims, 2 Drawing Sheets

(a)    (b)

(a)  (b)

OBJECTIVE LENS WITH THE DIFFRACTIVE SURFACE FOR DVD/CD COMPATIBLE OPTICAL PICKUP

BACKGROUND OF THE INVENTION

1. Field of the Invention

The present invention relates to an objective lens for a DVD/CD compatible optical pickup, and more particularly to an objective lens for a DVD/CD compatible optical pickup which can improve optical efficiency while minimizing aberration occurring due to different disc thicknesses of different optical storage media.

2. Description of the Related Art

An optical disc is used as a medium for recording information, which enables the recording/reproducing of information without bringing a recording/reproducing head into contact with the recording medium, and also improves recording density.

In order to reproduce information recorded on such an optical disc, a laser beam outputted from an optical pickup as a recording/reproducing head is irradiated to a signal recording layer of the optical disc, and an optical detector mounted on the optical pickup detects a laser beam reflected from the signal recording layer, thereby reading the information.

As an optical disc allowing recording/reproducing of information, there is, for example, an optical disc employing a phase change recording layer that is irradiated with a laser beam to alternate between a crystalline state and an amorphous state.

In order to record information on this kind of optical disc, a laser beam modulated according to a signal of the information to be recorded is irradiated to the signal recording layer.

There is a DVD (Digital Video Disc or Digital Versatile Disc), as one of the optical discs that use a phase change recording layer to permit recording/reproducing of information. The DVD has a recording density greatly improved over a CD (Compact Disc), an optical disc in wide use. While the CD has a recording track pitch of 1.6 µm, the DVD has a recording track pitch of 0.74 µm, thereby achieving high recording density.

In order to record information, by laser beam irradiation, on such an optical disc allowing high-density information recording, it is required to form a much smaller beam spot on the signal recording layer of the optical disc.

The spot diameter of a laser beam is proportional to the design wavelength of the laser beam, and inversely proportional to the numerical aperture (NA) of an objective lens that focuses the laser beam. Therefore, for achieving high recording density of an optical disc, it is required to increase the numerical aperture of the objective lens and decrease the wavelength of the laser beam.

In the meantime, a DVDP and a DVD-ROM is attracting attention in imaging/acoustic fields, as a device capable of performing high density recording/reproducing. For compatibility, an optical pickup device employed in the DVDP must be able to record and/or reproduce information when it adopts not only the DVD but also CD family such as CD, CD-R (CD-Recordable), CD-I and CD-G, as a recording medium.

However, the DVD has been standardized in a different thickness from the CD family, due to mechanical tolerance for disc tilt and the numerical aperture of an objective lens. The thickness of the conventional CD family is 1.2 mm, while the thickness of the DVD is 0.6 mm. Since the thickness of the CD family is different from that of the DVD, if an optical pickup device for the DVD is applied to the CD family, the thickness difference causes spherical aberration. This spherical aberration leads to a failure to obtain enough optical intensity to record an information signal, or lowers the quality of reproduced signals.

In addition, regarding the wavelength of a light source for reproducing, the DVD has also been standardized in a different wavelength range from the CD family. That is, the wavelength of the reproducing light source for the conventional CD family is about 780 nm, whereas the wavelength for the DVD is about 650 nm.

Due to the different standardizations, it is impossible for a conventional CDP to reproduce information recorded on the DVD. Thus, there is a need to develop the optical pickup device for DVD, which must also be compatible with the conventional CD family.

In the prior art, a ring-shaped optical disc device has been proposed, which can reproduce different kinds of optical discs such as CD and DVD.

Both the CD and the DVD (hereinafter, collectively referred to as an "optical disc") employ a transparent substrate that has an information recording surface at one side thereof. The optical disc is formed by attaching two such transparent substrates to each other so that the respective information recording layers face each other, or by attaching such a transparent substrate to a protective substrate so that an information recording layer thereof faces the protective substrate.

In order to reproduce an information signal stored in the optical disc having such a configuration, it is required for an optical disc device to focus a laser beam from a light source onto the information recording surface of the optical disc via the transparent substrate.

The wavelength of a laser beam used for the CD is different from that of the DVD, as described below. The optical disc device uses an objective lens in order to focus a laser beam.

As described above, the thickness of a transparent substrate used for the CD is 1.2 mm, whereas the thickness of a transparent substrate used for the DVD is 0.6 mm. The thickness of the transparent substrate on which the information recording surface is formed varies depending on the kind of optical disc or the wavelength of the laser beam.

For an optical disc device for reproducing different kinds of optical discs, it is required to focus a laser beam onto the information recording surface even if the thickness of the transparent substrate varies depending on the kind of optical disc.

In new optical disc devices recently suggested, it has been proposed to use a blue laser having a wavelength of about 400 nm in order to perform reproduction of information. It is thus expected that the optical disc device can use the CD for downward compatibility and the DVD now in use, and can also use such a new optical disc.

It is considered that such a ring-shaped optical disc device is classified into the following two types. In one type, for each kind of optical disc, an individual objective lens is installed in a pickup, and the objective lenses are exchanged according to the kind of optical disc to be used. In the other type, an individual pickup is installed for each kind of optical disc, and the pickups are exchanged according to the kind of optical disc to be used.

However, in order to realize a low cost, small size device, it is desirable to be able to use the same objective lens for any kind of optical disc.

One typical example of such a kind of objective lens can be seen in Japanese Patent Publication No. Hei9-145995. The objective lens described in this document has a lens surface divided into three or more concentric ring-shaped lens surfaces radially arranged, in which the refractive power of one ring-shaped lens surface of one color is different from that of another ring-shaped lens surface of another color.

Said one ring-shaped lens surface of one color allows a laser beam of a wavelength to be focused onto an information recording surface of a thin optical disc of 0.6 mm thickness (for example, DVD). On the other hand, said another ring-shaped lens surface of another color allows a laser beam of the same wavelength to be focused onto an information recording surface of a thick optical disc of 1.2 mm (for example, CD).

Another typical example can be seen in Japanese Patent Publication No. 2000-81566 (or U.S. Pat. No. 6,118,594). This document has disclosed an optical disc device that uses a laser beam of a short wavelength (635 nm or 650 nm) for the thin transparent substrate (DVD), and uses a laser beam of a long wavelength (780 nm) for the thick transparent substrate (CD). This optical disc device has an objective lens commonly used for the two laser beams.

This objective lens has a refractive lens surface having a positive refractive power, on which fine concentric ring-shaped steps are closely formed, thereby obtaining a diffractive lens structure. This diffractive lens structure is designed to focus a diffractive laser beam of a short wavelength onto the information recording surface of a thin transparent substrate (DVD), and to focus a diffractive laser beam of a long wavelength onto the information recording surface of a thick transparent substrate (CD).

The diffractive lens structure is also designed to focus a diffractive beam of the same diffractive order onto the information recording surface, no matter what kind of diffractive beam it is. The reason why a laser beam of a short wavelength is used for the DVD is because the recording density of the DVD is higher than that of the CD and it is thus required to throttle the beam spot to be smaller. As is well known, the size of an optical spot is proportional to the wavelength, and inversely proportional to the numerical aperture (NA).

A different ring-shaped objective lens has been proposed in Japanese Patent Publication No. 2001-51192, which has a phase-compensated lens structure in which ring-shaped phase shifters are formed on a surface of the lens. Firstly, in this objective lens, a lens surface, which allows removal of wavefront aberration due to a laser beam of a wavelength $\lambda_1$ (640 nm) used for the DVD, is defined as a reference lens surface. The surface of this objective lens is divided into a plurality of ring-shaped refractive surfaces radially arranged. Each ring-shaped refractive surface is formed to have a predetermined step depth from the reference lens surface (the i-th step depth from the center of the lens is denoted by "$d_i$"). Each refractive surface having a step depth ($d_i$) allows a laser beam for the DVD to be phase-shifted by an integral multiple ($m_i$) of the wavelength ($\lambda_1$) with respect to the reference lens surface, thereby reducing the wavefront aberration of the CD family.

Since it allows an objective lens to be commonly used for both the DVD and the CD, all the prior art described above has no need to provide means for exchanging an individual member, including an objective lens, used for each of the DVD and the CD, so it is advantageous in terms of cost and has a simpler configuration.

However, the prior art described above has the following disadvantages. First, the objective lens of Japanese Patent Publication No. Hei9-145995 uses different ring-shaped lens surfaces for the DVD and the CD, so it has many portions invalid for an incident laser beam, and thus has very low optical utilization efficiency.

In addition, the objective lens of Japanese Patent Publication No. 2000-81566 (or U.S. Pat. No. 6,118,594) uses diffractive beams obtained by the diffractive lens structure, so it is impossible to simultaneously obtain 100% diffractive efficiency for each of different wavelengths.

In order for the lens surface to have the diffractive lens structure, it is required to form minute steps on the lens surface. But, this is liable to be affected by manufacturing errors. An error at the time of designing the diffractive lens structure also causes deterioration of the diffractive efficiency.

Due to such diffractive efficiency deterioration or inherent impossibility of obtaining 100% diffractive efficiency, it is impossible to focus every incident beam onto the information recording surface formed on the transparent substrate of the optical disc, which causes an optical loss.

In addition, as described above, the ring-shaped objective lens disclosed in Japanese Patent Publication No. 2001-51192 has a phase-compensated lens structure for providing high optical utilization efficiency. A lens surface, which allows removal of wavefront aberration due to laser beams used for the DVD, is defined as a reference lens surface, and the surface of the lens is divided into a plurality of ring-shaped refractive surfaces radially arranged. In order to reduce wavefront aberration of laser beams for the CD, a ring-shaped refractive surface is formed to be recessed from the reference lens surface by a step depth ($d_i$), which corresponds to an integral multiple ($m_i$) of the wavelength ($\lambda 1$) of laser beams for the DVD. However, since it is inherently based on the DVD, it is impossible for only the step formation to sufficiently reduce the wavefront aberration for laser beams for the CD.

SUMMARY OF THE INVENTION

Therefore, the present invention has been made in view of the above problems, and it is an object of the present invention to provide an objective lens for a DVD/CD compatible optical pickup, which can improve optical efficiency while minimizing aberration occurring due to different disc thicknesses of different optical storage media.

In accordance with the present invention, the above and other objects can be accomplished by the provision of an objective lens for a DVD/CD compatible optical pickup, including: a first lens surface on which an optical beam having a different wavelength for each of a plurality of optical recording media respectively including transparent substrates of different thicknesses is incident, said first lens surface being an aspherical surface having a positive refractive power for refracting the optical beam and thus focusing it onto an information recording surface formed on a transparent substrate of an optical recording medium, said first lens surface including a diffractive grating formed thereon over the entire surface thereof; and a second lens surface being an aspherical surface having a negative refractive power for refracting the optical beam and thus focusing it onto the information recording surface formed on the transparent substrate of the optical recording medium.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the drawings.

Figure 1:
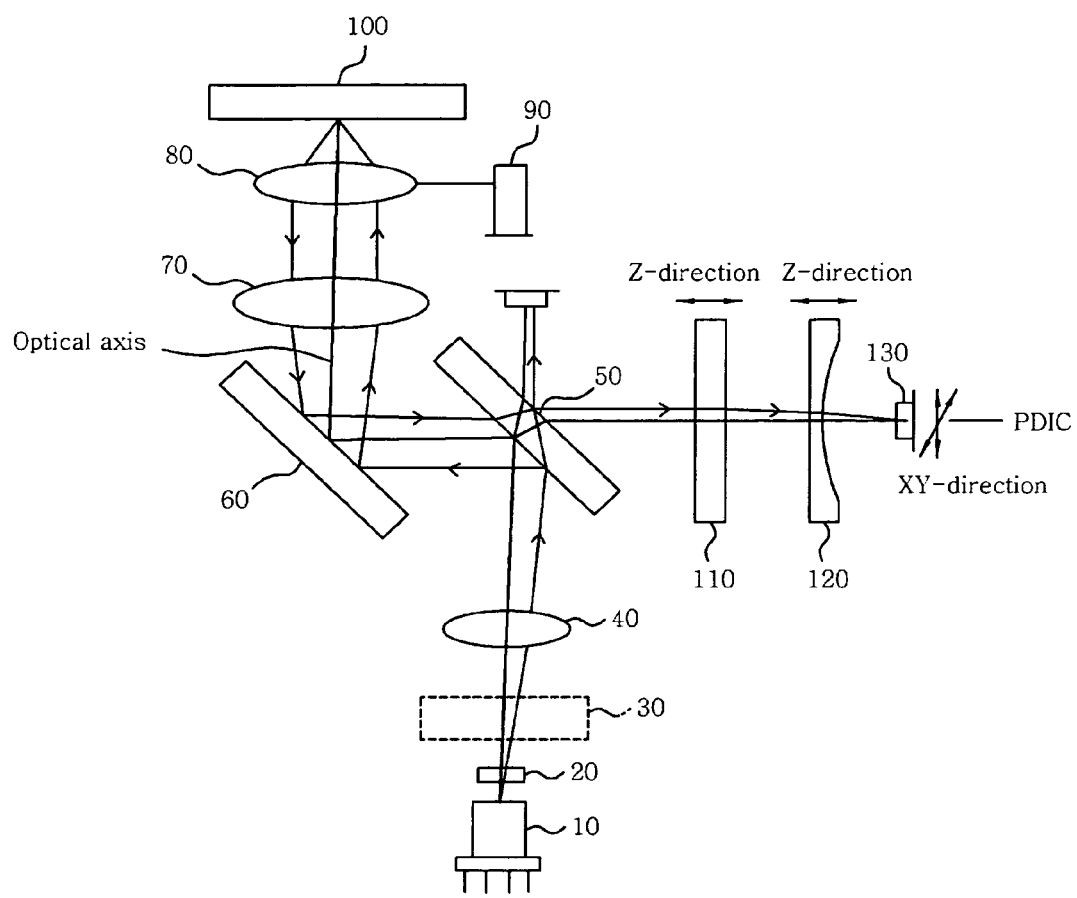
FIG. 1 shows the configuration of a compatible optical pickup device to which the present invention is applied.

FIG. 1 shows the configuration of a compatible optical pickup device to which the present invention is applied.

As shown in FIG. 1, a two-wavelength light source 10 generates two optical beams, one having a wavelength of 650 nm for the DVD family and the other having a wavelength of 780 nm for the CD family. Each of the optical beams for the DVD/CD families generated by the two-wavelength light source 10 is incident on a wavelength-selective diffractive grating 20, which diffracts the incident beam to separate it into three beams, in order to perform tracking/focusing control.

In the case where the three beams separated through the wavelength-selective diffractive grating 20 belong to the beam having a wavelength of 780 nm for the CD family, they are incident on an optical splitter 50 after being subjected to compensation for coma aberration, which occurs in an objective lens 80 described below, through an optical axis correction hologram 30. Here, the optical axis correction hologram 30 allows the respective optical axes of the separated beams to be coincident with each other to perform the compensation for coma aberration based on the optical axis deviation.

In the case where the three beams separated through the wavelength-selective diffractive grating 20 belong to the beam having a wavelength of 650 nm for the DVD family, they are incident on the optical splitter 50 without being subjected to the compensation for the coma aberration, because they do not cause coma aberration in the objective lens 80.

After being split by the optical splitter 50, an optical beam is totally reflected at a right angle by a mirror 60. The reflected beam is then incident on a collimating lens 70, through which the incident beam is changed to a planar waveform optical beam. After passing through the collimating lens 70, the optical beam is incident on the objective lens 80, through which the optical beam is focused onto a pit of an optical disc 100 in which data is stored.

Here, an actuator 90 functions to perform focusing/tracking control on the objective lens 80 based on external control signals.

An optical beam reflected from the optical disc 100 is split through the beam splitter 50 to be directed toward an optical detector 130 described below. After being split by the beam splitter 50, the beam is incident on the optical detector 130 having a predetermined PDIC pattern via a sensor lens 120. The sensor lens 120 causes astigmatism for detecting a focus error of an optical beam to perform focusing control on the optical detector 130.

Here, in the case where the optical beam to be incident on the optical detector 130 is an optical beam having a wavelength of 780 nm for the CD family, it is diffracted at a specific angle through a CD detection diffractive grating 110, so as to allow the beam spot thereof to correctly coincide with the PDIC pattern of the optical detector 130.

When the optical beam generated from the light source 10 is incident on the optical detector 130 after being reflected by the optical disc 100, the optical detector 130 converts the incident optical beam into an electrical signal, so as to record data on the optical disc 100 or reproduce the recorded data from the disc 100.

Figure 2:
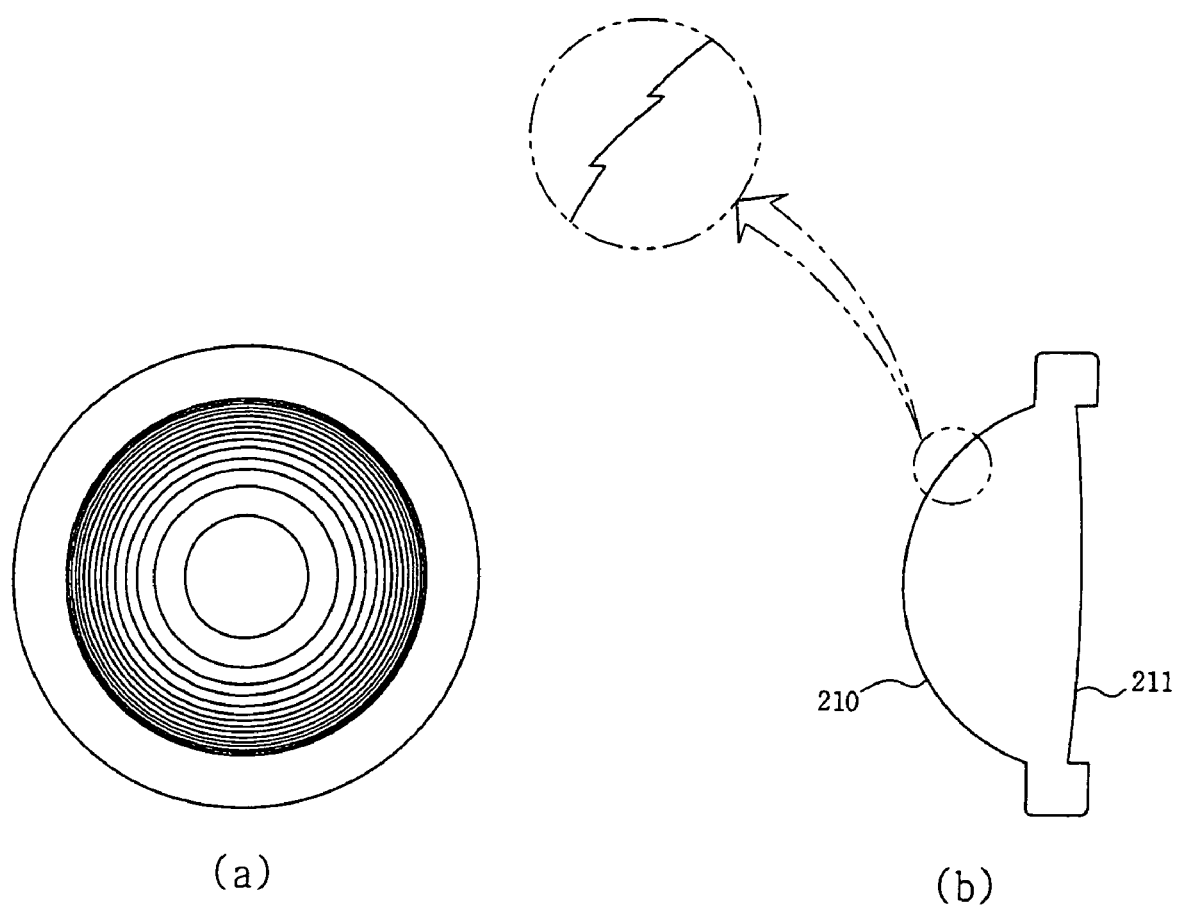
FIGS. 2a and 2b are front and side views showing an objective lens for the compatible optical pickup shown in FIG. 1, according to the present invention.

FIGS. 2a and 2b are front and side views showing an objective lens for an optical pickup, according to an embodiment of the present invention.

The configuration of the objective lens will now be described in more detail with reference to FIGS. 2a and 2b. The objective lens includes a first aspherical lens surface 210 having a positive refractive power and a second aspherical lens surface 211 having a positive refractive power. The objective lens is positioned so that the first aspherical lens surface 211 faces a light source, and the second aspherical lens surface 211 is opposite to the light source. The first aspherical lens surface 210 has a sawtooth-shaped diffractive grating structure so as to improve optical efficiency while minimizing aberration occurring due to different thicknesses of optical discs.

When the amount of sag Z of the first lens 210 defines an aspherical surface thereof, it is expressed by the following equation with a parameter being the height "h" from the optical axis.

$$z = \frac{r_i^{-1}h^2}{1+\sqrt{1-(1+k)r_i^{-1}h^2}} + Ah^4 + Bh^6 + Ch^8 + Dh^{10} + Eh^{12} + Fh^{14} + Gh^{16} + Hh^{18} + Jh^{20} \quad \text{[Expression 1]}$$

Here, "i" denotes the ordinal number of a surface from a light source, "$r_i$" denotes the curvature radius of an i-th surface, "k" denotes a conic constant, "h" denotes the distance from the optical axis to the lens surface, and A, B, C, . . . J denotes fourth, sixth, eighth . . . twentieth aspherical surface coefficients, respectively.

Optical phase difference $\Phi(h)$ in a diffractive lens is defined by the following phase function.

$$\Phi(h)=(C_1h^2+C_2h^4+C_3h^6+C_4h^8+C_5h^{10}\ldots)\times\lambda \quad \text{[Expression 2]}$$

Here, "h" denotes the distance from the optical axis to the lens surface, "$C_1$, $C_2$, $C_3$ . . . " denotes second, fourth, sixth . . . diffractive coefficients, respectively, and "$\lambda$" denotes wavelength of incident light.

An actual microscopic shape of the diffractive lens structure is defined like a Fresnel lens having a large number of concentric rings. The actual shape $\Phi'(h)$ is defined by subtracting $\lambda \times m$ (m:integer) from $\Phi(h)$ as follows.

$$\Phi'(h)=(\text{MOD}(C_1h^2+C_2h^4+\ldots+C,1)\times\lambda_B$$

Symbol $\lambda_B$ is a blaze wavelength for which the steps of the grating gives an optical path difference by one wavelength, and the diffractive efficiency becomes the maximum at the blaze wavelength $\lambda_B$. Symbol C is a constant defining a phase at a boundary between adjacent rings ($0<C\leq1$). The function MOD(x,y) represents the remainder when x is divided by y. The diffractive lens structure is formed on the base curve that is the lens surface of the refractive lens.

The lens has a center thickness of 2.20 mm, and has refractive indexes of 1.54065 and 1.53713 at wavelengths of 655 nm and 785 nm, respectively, and has a blaze wavelength of 715 nm. When the distance "h" is in the range of 0 to 1.6 mm, $C_1$, $C_2$ and $C_3$ are 0, −1.731035 and −0.139774, respectively.

In this case, k is −5.66134E-01, A is 0, B is −6.33910E-04, C is 3.79512E-05, D is 1.58394E-05, E is −1.08464E-05, and F is 1.00884E-06.

In addition, when the distance "h" is in the range of 1.6 to 2.0 mm, $C_1$, $C_2$ and $C_3$ are −6.993007, −0.097902 and −0.001399, respectively.

In this case, k is −9.31672E-01, A is 6.80832E-03, B is −1.55240E-04, C is 2.05226E-04, D is −5.13685E-05, E is 1.28641E-06, and F is 3.13362E-07.

On the other hand, regarding the second aspherical lens surface 211, $r_2$ is −8.125557, k is −104.216960, A is −0.1317125E-02, B is 0.167540E-02, C is −0.6788669E-03, D is −0.4133680E-04, E is 0.5953331E-04, and F is −0.778703E-05.

When "f" denotes the effective focal distance of the objective lens, and "Sr" denotes the distance along the optical axis from one point at which an optical beam passing through the optical axis on the last surface of the objective lens meets the lens surface to another point at which an effective optical beam passing through the upper side meets the lens surface, the objective lens must satisfy the following condition.

$$-37 < \frac{f}{Sr} < -28 \quad \text{[Expression 3]}$$

When "f" denotes the effective focal distance of the objective lens, and "t" denotes an interval along the optical axis between the front and rear surfaces of the objective lens, the objective lens must satisfy the following condition.

$$1.4 < \frac{f}{t} < 1.7 \quad \text{[Expression 4]}$$

A sawtooth-shaped diffractive grating is formed on the first lens surface 210. It can be seen from the front view of FIG. 2a that the grating is formed on the first lens surface 210 over the entire surface thereof.

The phase distribution λ(h) of the diffractive grating of the first lens 210 is defined only with an even-order function as shown in the above Expression 2.

Consequently, since the optical path difference between an optical path in a medium of refractive index (n) and an optical path in the air is given as (n−1), the step depth d of each of the rings (diffractive elements) constituting the diffractive lens is expressed by the following equation when the design wavelength is λ nm.

$$d = \frac{\lambda}{(n-1) \cdot 10^{-3}} \quad \text{[Expression 5]}$$

Alternatively, the step depth d is an integral multiple of the above value. According to the present invention, the mean wavelength 715 nm of the two wavelengths 655 nm and 785 nm is used as the wavelength λ in calculating the step depth d.

The objective lens according to the present invention minimizes aberration caused by different optical disc thicknesses between different optical storage media, so as to greatly improve the performance of the objective lens, and increase the optical efficiency thereof, and also minimize performance degradation due to the variance of temperature. These improved results are shown in the following Table 1.

TABLE 1

| Annular Type | Partial Diffractive Type | Full Diffractive Type |
| --- | --- | --- |
| DVD optical efficiency: 74 | DVD optical efficiency: 97 | DVD optical efficiency: 100 |
| CD optical efficiency: 56 | CD optical efficiency: 70 | CD optical efficiency: 100 |

For easy comparison between the optical efficiencies of different diffractive types, this table shows the comparison results, assuming that the full diffractive type according to the present invention has an optical efficiency of 100. It can be seen from this table that the present invention is very advantageous.

As apparent from the above description, an objective lens for a DVD/CD compatible optical pickup according to the present invention minimizes aberration caused by different optical disc thicknesses of different optical storage media, thereby greatly improving the performance thereof.

In addition, the objective lens according to the present invention improves the optical efficiency thereof and minimizes performance degradation due to temperature variation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An objective lens for a DVD/CD compatible optical pickup, said objective lens being a refractive lens having a positive refractive power, said refractive lens including:
    a first lens surface on which an optical beam having a different wavelength for each of a plurality of optical recording media respectively including transparent substrates of different thicknesses is incident, said first lens surface having a positive refractive power for refracting the optical beam and thus focusing it onto an information recording surface formed on a transparent substrate of an optical recording medium, said first lens surface including a diffractive grating formed thereon over the entire surface thereof, said first lens surface being an aspherical surface satisfying the following condition:

$$-37 < \frac{f}{Sr} < -28,$$

where "f" denotes an effective focal distance of the objective lens, and "Sr" denotes a distance along an optical axis of the lens from one point at which an optical beam passing through the optical axis on the last surface of the objective lens meets the lens surface to another point at which an effective optical beam passing through the upper side meets the lens surface; and a second lens surface being an aspherical surface having a positive refractive power for refracting the optical beam and thus focusing it onto the information recording surface formed on the transparent substrate of the optical recording medium.

2. The objective lens according to claim 1, wherein the aspherical surfaces of the first and second lens surfaces satisfy the following two equations:

$$z = \frac{r_i^{-1}h^2}{1+\sqrt{1-(1+k)r_i^{-1}h^2}} + Ah^4 + Bh^6 +$$
$$Ch^8 + Dh^{10} + Eh^{12} + Fh^{14} + Gh^{16} + Hh^{18} + Jh^{20},$$

where "i" denotes the ordinal number of a surface from a light source, "$r_i$" denotes a curvature radius of an i-th surface, "k" denotes a conic constant, "h" denotes a distance from the optical axis to the lens surface, and "A, B, C, ... J" denotes fourth, sixth, eighth ... twentieth aspherical surface coefficients, respectively, and $$\Phi'(h) = (MOD(C_1h^2 + C_2h^4 + C_3h^6 \ldots + C, 1) \times \lambda_B,$$

where "$\Phi'(h)$" denotes the actual microscopic shape of the diffractive lens structure; "h" denotes a distance from the optical axis to the lens surface; "$C_1, C_2, C_3 \ldots$" denotes second, fourth, sixth ... diffractive coefficients, respectively; symbol $\lambda_B$ is a blaze wavelength for which the steps of the grating gives an optical path difference by one wavelength and the diffractive efficiency becomes the maximum at the blaze wavelength $\lambda_B$; symbol C is a constant defining a phase at a boundary between adjacent rings ($0 < C \leq 1$); the function $MOD(x,y)$ represents the remainder when x is divided by y; and the diffractive lens structure is formed on the base curve that is the lens surface of the refractive lens.

3. The objective lens according to claim 2, wherein the lens has a center thickness of 2.20 mm, and has refractive indexes of 1.54065 and 1.53713 at wavelengths of 655 nm and 785 nm, respectively, and further has a blaze wavelength of 715 nm, wherein when the distance h of the first lens surface is in the range of 0 to 1.6 mm, the radius of curvature is 2.117248 mm, the diffractive coefficients $C_1$, $C_2$ and $C_3$ are 0, −1.731035 and −0.139774, respectively; the conic constant k is −5.66134E-01; and the aspherical surface coefficient A is 0, B is −6.33910E-04, C is 3.79512E-05, D is 1.58394E-05, E is −1.08464E-05, and F is 1.00884E-06, wherein when the distance h is in the range of 1.6 to 2.0 mm, the radius of curvature is 2.212176 mm, the diffractive coefficients $C_1$, $C_2$ and $C_3$ are −6.993007, −0.097902, −0.001399, respectively; the conic constant k is −9.31672E-01; and the aspherical surface coefficient A is 6.80832E-03, B is −1.55240E-04, C is 2.05226E-04, D is −5.13685E-05, E is 1.28641E-06, and F is 3.13362E-07, and wherein regarding the second lens surface, $r_2$ is −8.125557 mm, the conic constant k is −104.216960, the aspherical surface coefficient A is −0.1317125E-02, B is 0.167540E-02, C is −0.6788669E-03, D is −0.4133680E-04, E is 0.5953331E-04, and F is −0.778703E-05.

4. The objective lens according to claim 1, satisfying the following condition:

$$1.4 < \frac{f}{t} < 1.7,$$

where "f" denotes the effective focal distance of the objective lens, and "t" denotes an interval along the optical axis between front and rear surfaces of the objective lens.

5. The objective lens according to claim 4, wherein the aspherical surfaces of the first and second lens surfaces satisfy the following two equations:

$$z = \frac{r_i^{-1}h^2}{1+\sqrt{1-(1+k)r_i^{-1}h^2}} + Ah^4 + Bh^6 +$$
$$Ch^8 + Dh^{10} + Eh^{12} + Fh^{14} + Gh^{16} + Hh^{18} + Jh^{20},$$

where "i" denotes the ordinal number of a surface from a light source, "$r_i$" denotes a curvature radius of an i-th surface, "k" denotes a conic constant, "h" denotes a distance from the optical axis to the lens surface, and "A, B, C, ... J" denotes fourth, sixth, eighth ... twentieth aspherical surface coefficients, respectively, and $$\Phi'(h) = (MOD(C_1h^2 + C_2h^4 + C_3h^6 \ldots + C, 1) \times \lambda_B,$$

where "$\Phi'(h)$" denotes the actual microscopic shape of the diffractive lens structure; "h" denotes a distance from the optical axis to the lens surface; "$C_1, C_2, C_3 \ldots$" denotes second, fourth, sixth ... diffractive coefficients, respectively; symbol $\lambda_B$ is a blaze wavelength for which the steps of the grating gives an optical path difference by one wavelength and the diffractive efficiency becomes the maximum at the blaze wavelength $\lambda_B$; symbol C is a constant defining a phase at a boundary between adjacent rings ($0 < C \leq 1$); the function $MOD(x,y)$ represents the remainder when x is divided by y; and the diffractive lens structure is formed on the base curve that is the lens surface of the refractive lens.

6. The objective lens according to claim 5, wherein the lens has a center thickness of 2.20 mm, and has refractive indexes of 1.54065 and 1.53713 at wavelengths of 655 nm and 785 nm, respectively, and further has a blaze wavelength of 715 nm, wherein when the distance h of the first lens surface is in the range of 0 to 1.6 mm, the radius of curvature is 2.117248 mm, the diffractive coefficients $C_1$, $C_2$ and $C_3$ are 0, −1.731035 and −0.139774, respectively; the conic constant k is −5.66134E-01; and the aspherical surface coefficient A is 0, B is −6.33910E-04, C is 3.79512E-05, D is 1.58394E-05, E is −1.08464E-05, and F is 1.00884E-06, wherein when the distance h is in the range of 1.6 to 2.0 mm, the radius of curvature is 2.212176 mm, the diffractive coefficients $C_1$, $C_2$ and $C_3$ are −6.993007, −0.097902, −0.001399, respectively; the conic constant k is −9.31672E-01; and the aspherical surface coefficient A is 6.80832E-03, B is −1.55240E-04, C is 2.05226E-04, D is −5.13685E-05, E is 1.28641E-06, and F is 3.13362E-07, and wherein regarding the second lens surface, $r_2$ is −8.125557 mm, the conic constant k is −104.216960, the aspherical surface coefficient A is −0.1317125E-02, B is 0.167540E-02, C is −0.6788669E-03, D is −0.4133680E-04, E is 0.5953331E-04, and F is −0.778703E-05.

7. The objective lens according to claim 1, wherein the diffractive grating formed on the first lens surface over the entire surface thereof is a sawtooth-shaped diffractive grating.

8. The objective lens according to claim 7, wherein the aspherical surfaces of the first and second lens surfaces satisfy the following two equations:

$$z = \frac{r_i^{-1}h^2}{1+\sqrt{1-(1+k)r_i^{-1}h^2}} + Ah^4 + Bh^6 + Ch^8 + Dh^{10} + Eh^{12} + Fh^{14} + Gh^{16} + Hh^{18} + Jh^{20},$$

where "i" denotes the ordinal number of a surface from a light source, "$r_i$" denotes a curvature radius of an i-th surface, "k" denotes a conic constant, "h" denotes a distance from the optical axis to the lens surface, and "A, B, C, . . . J" denotes fourth, sixth, eighth . . . twentieth aspherical surface coefficients, respectively, and $$\Phi'(h)=(\text{MOD}(C_1h^2+C_2h^4+C_3h^6 \ldots +C,1)\times\lambda_B,$$

where "$\Phi'(h)$" denotes the actual microscopic shape of the diffractive lens structure; "h" denotes a distance from the optical axis to the lens surface; "$C_1, C_2, C_3 \ldots$" denotes second, fourth, sixth . . . diffractive coefficients, respectively; symbol $\lambda_B$ is a blaze wavelength for which the steps of the grating gives an optical path difference by one wavelength and the diffractive efficiency becomes the maximum at the blaze wavelength $\lambda_B$; symbol C is a constant defining a phase at a boundary between adjacent rings (0<C≦1); the function MOD(x,y) represents the remainder when x is divided by y; and the diffractive lens structure is formed on the base curve that is the lens surface of the refractive lens.

9. The objective lens according to claim 8, wherein the lens has a center thickness of 2.20 mm, and has refractive indexes of 1.54065 and 1.53713 at wavelengths of 655 nm and 785 nm, respectively, and further has a blaze wavelength of 715 nm,
   wherein when the distance h of the first lens surface is in the range of 0 to 1.6 mm, the radius of curvature is 2.117248 mm, the diffractive coefficients $C_1$, $C_2$ and $C_3$ are 0, −1.731035 and −0.139774, respectively; the conic constant k is −5.66134E-01; and the aspherical surface coefficient A is 0, B is −6.33910E-04, C is 3.79512E-05, D is 1.58394E-05, E is −1.08464E-05, and F is 1.00884E-06,
   wherein when the distance h is in the range of 1.6 to 2.0 mm, the radius of curvature is 2.212176 mm, the diffractive coefficients $C_1$, $C_2$ and $C_3$ are −6.993007, −0.097902, −0.001399, respectively; the conic constant k is −9.31672E-01; and the aspherical surface coefficient A is 6.80832E-03, B is −1.55240E-04, C is 2.05226E-04, D is −5.13685E-05, E is 1.28641E-06, and F is 3.13362E-07, and
   wherein regarding the second lens surface, $r_2$ is −8.125557 mm, the conic constant k is −104.216960, the aspherical surface coefficient A is −0.1317125E-02, B is 0.167540E-02, C is −0.6788669E-03, D is −0.4133680E-04, E is 0.5953331E-04, and F is −0.778703E-05.

10. The objective lens according to claim 7, wherein a step depth "d" of each of rings constituting the sawtooth-shaped diffractive grating of the first lens surface is expressed by the following equation:

$$d = \frac{\lambda}{(n-1)\cdot 10^{-3}},$$

where a refractive index is n, and a design wavelength is λnm.

11. The objective lens according to claim 10, wherein the aspherical surfaces of the first and second lens surfaces satisfy the following two equations:

$$z = \frac{r_i^{-1}h^2}{1+\sqrt{1-(1+k)r_i^{-1}h^2}} + Ah^4 + Bh^6 + Ch^8 + Dh^{10} + Eh^{12} + Fh^{14} + Gh^{16} + Hh^{18} + Jh^{20},$$

where "i" denotes the ordinal number of a surface from a light source, "$r_i$" denotes a curvature radius of an i-th surface, "k" denotes a conic constant, "h" denotes a distance from the optical axis to the lens surface, and "A, B, C, . . . J" denotes fourth, sixth, eighth . . . twentieth aspherical surface coefficients, respectively, and $$\Phi'(h)=(\text{MOD}(C_1h^2+C_2h^4+C_3h^6 \ldots +C,1)\times\lambda_B,$$

where "$\Phi'(h)$" denotes the actual microscopic shape of the diffractive lens structure; "h" denotes a distance from the optical axis to the lens surface; "$C_1, C_2, C_3 \ldots$" denotes second, fourth, sixth . . . diffractive coefficients, respectively; symbol $\lambda_B$ is a blaze wavelength for which the steps of the grating gives an optical path difference by one wavelength and the diffractive efficiency becomes the maximum at the blaze wavelength $\lambda_B$; symbol C is a constant defining a phase at a boundary between adjacent rings (0<C≦1); the function MOD(x,y) represents the remainder when x is divided by y; and the diffractive lens structure is formed on the base curve that is the lens surface of the refractive lens.

12. The objective lens according to claim 11, wherein the lens has a center thickness of 2.20 mm, and has refractive indexes of 1.54065 and 1.53713 at wavelengths of 655 nm and 785 nm, respectively, and further has a blaze wavelength of 715 nm,
   wherein when the distance h of the first lens surface is in the range of 0 to 1.6 mm, the radius of curvature is 2.117248 mm, the diffractive coefficients $C_1$, $C_2$ and $C_3$ are 0, −1.731035 and −0.139774, respectively; the conic constant k is −5.66134E-01; and the aspherical surface coefficient A is 0, B is −6.33910E-04, C is 3.79512E-05, D is 1.58394E-05, E is −1.08464E-05, and F is 1.00884E-06,
   wherein when the distance h is in the range of 1.6 to 2.0 mm, the radius of curvature is 2.212176 mm, the diffractive coefficients $C_1$, $C_2$ and $C_3$ are −6.993007, −0.097902, −0.001399, respectively; the conic constant k is −9.31672E-01; and the aspherical surface coefficient A is 6.80832E-03, B is −1.55240E-04, C is 2.05226E-04, D is −5.13685E-05, E is 1.28641E-06, and F is 3.13362E-07, and wherein regarding the second lens surface, $r_2$ is −8.125557 mm, the conic constant k is −104.216960, the aspherical surface coefficient A is −0.1317125E-02, B is 0.167540E-02, C is −0.6788669E-03, D is −0.4133680E-04, E is 0.5953331E-04, and F is −0.778703E-05.

13. The objective lens according to claim 10, wherein a mean wavelength 715 nm of the two wavelengths 655 nm and 785 nm is used as the wavelength of λnm in calculating the step depth of the sawtooth-shaped diffractive grating of the first lens surface.

14. The objective lens according to claim 13, wherein the aspherical surfaces of the first and second lens surfaces satisfy the following two equations:

$$z = \frac{r_i^{-1}h^2}{1+\sqrt{1-(1+k)r_i^{-1}h^2}} + Ah^4 + Bh^6 + Ch^8 + Dh^{10} + Eh^{12} + Fh^{14} + Gh^{16} + Hh^{18} + Jh^{20},$$

where "i" denotes the ordinal number of a surface from a light source, "$r_i$" denotes a curvature radius of an i-th surface, "k" denotes a conic constant, "h" denotes a distance from the optical axis to the lens surface, and "A, B, C, . . . J" denotes fourth, sixth, eighth . . . twentieth aspherical surface coefficients, respectively, and $$\Phi'(h) = (MOD(C_1h^2 + C_2h^4 + C_3h^6 \ldots + C,1) \times \lambda_B,$$

where "Φ'(h)" denotes the actual microscopic shape of the diffractive lens structure; "h" denotes a distance from the optical axis to the lens surface; "$C_1, C_2, C_3$ . . . " denotes second, fourth, sixth . . . diffractive coefficients, respectively; symbol $\lambda_B$ is a blaze wavelength for which the steps of the grating gives an optical path difference by one wavelength and the diffractive efficiency becomes the maximum at the blaze wavelength $\lambda_B$; symbol C is a constant defining a phase at a boundary between adjacent rings (0<C≦1); the function MOD(x,y) represents the remainder when x is divided by y; and the diffractive lens structure is formed on the base curve that is the lens surface of the refractive lens.

15. The objective lens according to claim 14, wherein the lens has a center thickness of 2.20 mm, and has refractive indexes of 1.54065 and 1.53713 at wavelengths of 655 nm and 785 nm, respectively, and further has a blaze wavelength of 715 nm, wherein when the distance h of the first lens surface is in the range of 0 to 1.6 mm, the radius of curvature is 2.117248 mm, the diffractive coefficients $C_1, C_2$ and $C_3$ are 0, −1.731035 and −0.139774, respectively; the conic constant k is −5.66134E-01; and the aspherical surface coefficient A is 0, B is −6.33910E-04, C is 3.79512E-05, D is 1.58394E-05, E is −1.08464E-05, and F is 1.00884E-06, wherein when the distance h is in the range of 1.6 to 2.0 mm, the radius of curvature is 2.212176 mm, the diffractive coefficients $C_1, C_2$ and $C_3$ are −6.993007, −0.097902, −0.001399, respectively; the conic constant k is −9.31672E-01; and the aspherical surface coefficient A is 6.80832E-03, B is −1.55240E-04, C is 2.05226E-04, D is −5.13685E-05, E is 1.28641E-06, and F is 3.13362E-07, and wherein regarding the second lens surface, $r_2$ is −8.125557 mm, the conic constant k is −104.216960, the aspherical surface coefficient A is −0.1317125E-02, B is 0.167540E-02, C is −0.6788669E-03, D is −0.4133680E-04, E is 0.5953331E-04, and F is −0.778703E-05.

16. The objective lens according to claim 1, wherein the objective lens's thickness, defined by a distance between the first and second lens surfaces along the optical axis, is 2.20 mm or more.

17. The objective lens according to claim 16, wherein the aspherical surfaces of the first and second lens surfaces satisfy the following two equations:

$$z = \frac{r_i^{-1}h^2}{1+\sqrt{1-(1+k)r_i^{-1}h^2}} + Ah^4 + Bh^6 + Ch^8 + Dh^{10} + Eh^{12} + Fh^{14} + Gh^{16} + Hh^{18} + Jh^{20},$$

where "i" denotes the ordinal number of a surface from a light source, "$r_i$" denotes a curvature radius of an i-th surface, "k" denotes a conic constant, "h" denotes a distance from the optical axis to the lens surface, and "A, B, C, . . . J" denotes fourth, sixth, eighth . . . twentieth aspherical surface coefficients, respectively, and $$\Phi'(h) = (MOD(C_1h^2 + C_2h^4 + C_3h^6 \ldots + C,1) \times \lambda_B,$$

where "Φ'(h)" denotes the actual microscopic shape of the diffractive lens structure; "h" denotes a distance from the optical axis to the lens surface; "$C_1, C_2, C_3$ . . . " denotes second, fourth, sixth . . . diffractive coefficients, respectively; symbol $\lambda_B$ is a blaze wavelength for which the steps of the grating gives an optical path difference by one wavelength and the diffractive efficiency becomes the maximum at the blaze wavelength $\lambda_B$; symbol C is a constant defining a phase at a boundary between adjacent rings (0<C≦1); the function MOD(x,y) represents the remainder when x is divided by y; and the diffractive lens structure is formed on the base curve that is the lens surface of the refractive lens.

18. The objective lens according to claim 17, wherein the lens has a center thickness of 2.20 mm, and has refractive indexes of 1.54065 and 1.53713 at wavelengths of 655 nm and 785 nm, respectively, and further has a blaze wavelength of 715 nm, wherein when the distance h of the first lens surface is in the range of 0 to 1.6 mm, the radius of curvature is 2.117248 mm, the diffractive coefficients $C_1, C_2$ and $C_3$ are 0, −1.731035 and −0.139774, respectively; the conic constant k is −5.66134E-01; and the aspherical surface coefficient A is 0, B is −6.33910E-04, C is 3.79512E-05, D is 1.58394E-05, E is −1.08464E-05, and F is 1.00884E-06, wherein when the distance h is in the range of 1.6 to 2.0 mm, the radius of curvature is 2.212176 mm, the diffractive coefficients $C_1$, $C_2$ and $C_3$ are −6.993007, −0.097902, −0.001399, respectively; the conic constant k is −9.31672E-01; and the aspherical surface coefficient A is 6.80832E-03, B is −1.55240E-04, C is 2.05226E-04, D is −5.13685E-05, E is 1.28641E-06, and F is 3.13362E-07, and wherein regarding the second lens surface, $r_2$ is −8.125557 mm, the conic constant k is −104.216960, the aspherical surface coefficient A is −0.1317125E-02, B is 0.167540E-02, C is −0.6788669E-03, D is −0.4133680E-04, E is 0.5953331E-04, and F is −0.778703E-05.

* * * * *